(12) United States Patent
Essey et al.

(10) Patent No.: US 9,846,628 B2
(45) Date of Patent: Dec. 19, 2017

(54) INDICATING PARALLEL OPERATIONS WITH USER-VISIBLE EVENTS

(75) Inventors: Edward G. Essey, Seattle, WA (US); Igor Ostrovsky, Bellevue, WA (US); Pooja Nagpal, Seattle, WA (US); Huseyin S. Yildiz, Kenmore, WA (US); Hazim Shafi, Redmond, WA (US); William T. Colburn, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1014 days.

(21) Appl. No.: 12/816,165

(22) Filed: Jun. 15, 2010

(65) Prior Publication Data

US 2011/0307905 A1    Dec. 15, 2011

(51) Int. Cl.
| G06F 9/44 | (2006.01) |
| G06F 3/048 | (2013.01) |
| G06F 11/32 | (2006.01) |
| G06F 11/34 | (2006.01) |

(52) U.S. Cl.
CPC ........ *G06F 11/323* (2013.01); *G06F 11/3409* (2013.01); *G06F 11/3476* (2013.01); *G06F 2201/86* (2013.01)

(58) Field of Classification Search
None
See application file for complete search history.

(56) References Cited

U.S. PATENT DOCUMENTS

| 5,048,018 | A |   | 9/1991 | Bernstein et al. |
| 5,168,554 | A |   | 12/1992 | Luke |
| 5,862,381 | A | * | 1/1999 | Advani et al. ................ 717/125 |
| 6,052,515 | A | * | 4/2000 | Bruckhaus .................... 716/139 |

(Continued)

FOREIGN PATENT DOCUMENTS

CN        1326567 A        12/2001

OTHER PUBLICATIONS

Tan et al.; "An Automated Black Box Testing Tool for Parallel Programming Library"; Apr. 17, 2009; 2009 International Conference on Software Testing Verification and Validation; pp. 307-316.*

(Continued)

*Primary Examiner* — Umut Onat
(74) *Attorney, Agent, or Firm* — Workman Nydegger (57) ABSTRACT

The present invention extends to methods, systems, and computer program products for indicating parallel operations with user-visible events. Event markers can be used to indicate an abstracted outer layer of execution as well as expose internal specifics of parallel processing systems, including systems that provide data parallelism. Event markers can be used to show a variety of execution characteristics including higher-level markers to indicate the beginning and end of an execution program (e.g., a query). Inside the execution program (query) individual fork/join operations can be indicated with sub-levels of markers to expose their operations. Additional decisions made by an execution engine, such as, for example, when elements initially yield, when queries overlap or nest, when the query is cancelled, when the query bails to sequential operation, when prema- (Continued)

ture merging or re-partitioning are needed can also be exposed.

19 Claims, 5 Drawing Sheets

(56) References Cited

U.S. PATENT DOCUMENTS

| | | | | |
|---|---|---|---|---|
| 6,789,054 | B1* | 9/2004 | Makhlouf | 703/6 |
| 6,832,367 | B1 | 12/2004 | Choi et al. | |
| 7,493,224 | B2 | 2/2009 | Levine et al. | |
| 2004/0117768 | A1 | 6/2004 | Chang et al. | |
| 2006/0130000 | A1 | 6/2006 | Miyao et al. | |
| 2006/0156284 | A1 | 7/2006 | Srinivasan | |
| 2006/0248401 | A1* | 11/2006 | Carroll et al. | 714/38 |
| 2009/0222825 | A1 | 9/2009 | Upadhyaya et al. | |
| 2009/0320005 | A1* | 12/2009 | Toub et al. | 717/149 |

OTHER PUBLICATIONS

Cunha, Jose C., et al., "A Framework to Support Parallel and Distributed Debugging", In Proceedings of the International Conference on High-Performance Computing and Networking (HPCN'98), 1998, pp. 708-717.

Wolf, Felix, et al., "Large Event Traces in Parallel Performance Analysis", In 8th Workshop Parallel Systems and Algorithms (PASA), Lecture Notes in Informatics, Frankfurt/Main, 2006, 10 pages.

Franke, Hubertus, et al., "MPI Programming Environment for IBM SP1/SP2", In Proceedings of the International Symposium on Computer Architecture, 1995, 9 pages.

"First Office Action and Search Report Issued in Chinese Patent Application No. 201110170811.2", dated Mar. 27, 2015, 15 Pages.

"Office Action Issued in Chinese Patent Application No. 201110170811.2", dated Oct. 17, 2016, 9 Pages.

"Second Office Action and Search Report Issued in Chinese Patent Application No. 201110170811.2", dated Dec. 2, 2015, 17 Pages.

"Third Office Action Issued in Chinese Patent Application No. 201110170811.2", dated May 9, 2016, 12 Pages.

* cited by examiner

INDICATING PARALLEL OPERATIONS WITH USER-VISIBLE EVENTS

CROSS-REFERENCE TO RELATED APPLICATIONS

Not Applicable.

BACKGROUND

1. Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments. Further, many computer systems include a multi-core processor or multiple processors.

Thus, many computing environments include a multiple processing elements (e.g., computers, processors, cores, etc.) that can be used to execute instructions. To utilize multiple processing elements, software can be specifically developed for parallel (as opposed to sequential) execution. Parallel execution utilizes multiple processing elements to solve a problem by breaking the problem into independent parts so that each processing element can execute instructions to solve its part of the problem concurrently (or "in parallel") with other processing elements. As such, many calculations can be carried out simultaneously thereby reducing runtime.

However, developing software for parallel execution (often referred to as "parallel programming") introduces a number of technical challenges not present when developing software for sequential execution. For example, parallel execution requires communication and coordination between different processing elements to break a problem into independent parts and merge results from the independent parts back into an overall solution to the problem. Thus, to use parallel programming, an application developer must typically have additional technical knowledge related to inter-process (or inter-thread) communication. However, some application developers may lack the desire and/or aptitude to obtain this further technical knowledge.

Due at least in part to requiring this additional technical knowledge, parallel programming abstractions have been developed that abstract the technical details of parallel execution from the application developer. For example, these products can abstract underlying implementation and mechanics of inter-process (or inter-thread) communication from the application developer. As such, by leveraging these parallel programming abstractions, the application developer can concentrate more on the functionality of their application, leading to productive gains in application development.

Unfortunately, these same abstractions hide program execution details that may need to be understood for performance tuning and debugging of application errors. For example, when a program executes in a less than optimal manner or when errors occur, these abstractions limit the information available to the application developer to correct and/or otherwise address the program's execution.

BRIEF SUMMARY

The present invention extends to methods, systems, and computer program products for indicating parallel operations with user-visible events. In some embodiments, program execution details resulting from parallel execution of a program are presented at the computer system.

A program is executed on the computer system. The program is configured for parallel execution on a plurality of processor elements across the plurality of threads. Event markers are inserted into the runtime system. The event markers correspond to events that are of interest to a user. The event markers are used to better understand the performance of the program.

An event log is merged with one or more of: processor utilization information and thread activity information into graphical data. The graphical data represents one or more of how the plurality of processing elements and plurality of threads were utilized during execution of the instructions that generated the events of interest. The processor utilization information indicates the utilization of each of the plurality of processing elements during execution of the instructions. The thread activity indicates thread state of the plurality of threads during execution of the instructions.

The graphical data is supplemented with further graphical data. The further graphical data represents visualizations of the event markers generated by the instructions. The graphical data and further graphical data is visually presented. Presentation of the graphical data and further graphical data visually indicates one or more of processor utilization and thread activity at least during execution of the instructions along with the visualizations of the event markers indicating the events of interest.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for indicating parallel operations with user-visible events. In some embodiments, program execution details resulting from parallel execution of a program are presented at the computer system.

A program is executed on the computer system. The program is configured for parallel execution on a plurality of processor elements across the plurality of threads. Event markers are inserted into the runtime system. The event markers correspond to events that are of interest to a user. The event markers are used to better understand the performance of the program.

An event log is merged with one or more of: processor utilization information and thread activity information into graphical data. The graphical data represents one or more of how the plurality of processing elements and plurality of threads were utilized during execution of the instructions that generated the events of interest. The processor utilization information indicates the utilization of each of the plurality of processing elements during execution of the instructions. The thread activity indicates thread state of the plurality of threads during execution of the instructions.

The graphical data is supplemented with further graphical data. The further graphical data represents visualizations of the event markers generated by the instructions. The graphical data and further graphical data is visually presented. Presentation of the graphical data and further graphical data visually indicates one or more of processor utilization and thread activity at least during execution of the instructions along with the visualizations of the event markers indicating the events of interest.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (or computer storage devices). Computer-readable media that carry computer-executable instructions are transmission media. Thus, by way of example, and not limitation, embodiments of the invention can comprise at least two distinctly different kinds of computer-readable media: computer storage media (or devices) and transmission media.

Computer storage media (or devices) includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or devices) (or vice versa). For example, computer-executable instructions or data structures received over a network or data link can be buffered in RAM within a network interface module (e.g., a "NIC"), and then eventually transferred to computer system RAM and/or to less volatile computer storage media (or devices) at a computer system. Thus, it should be understood that computer storage media (or devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Figure 1A:
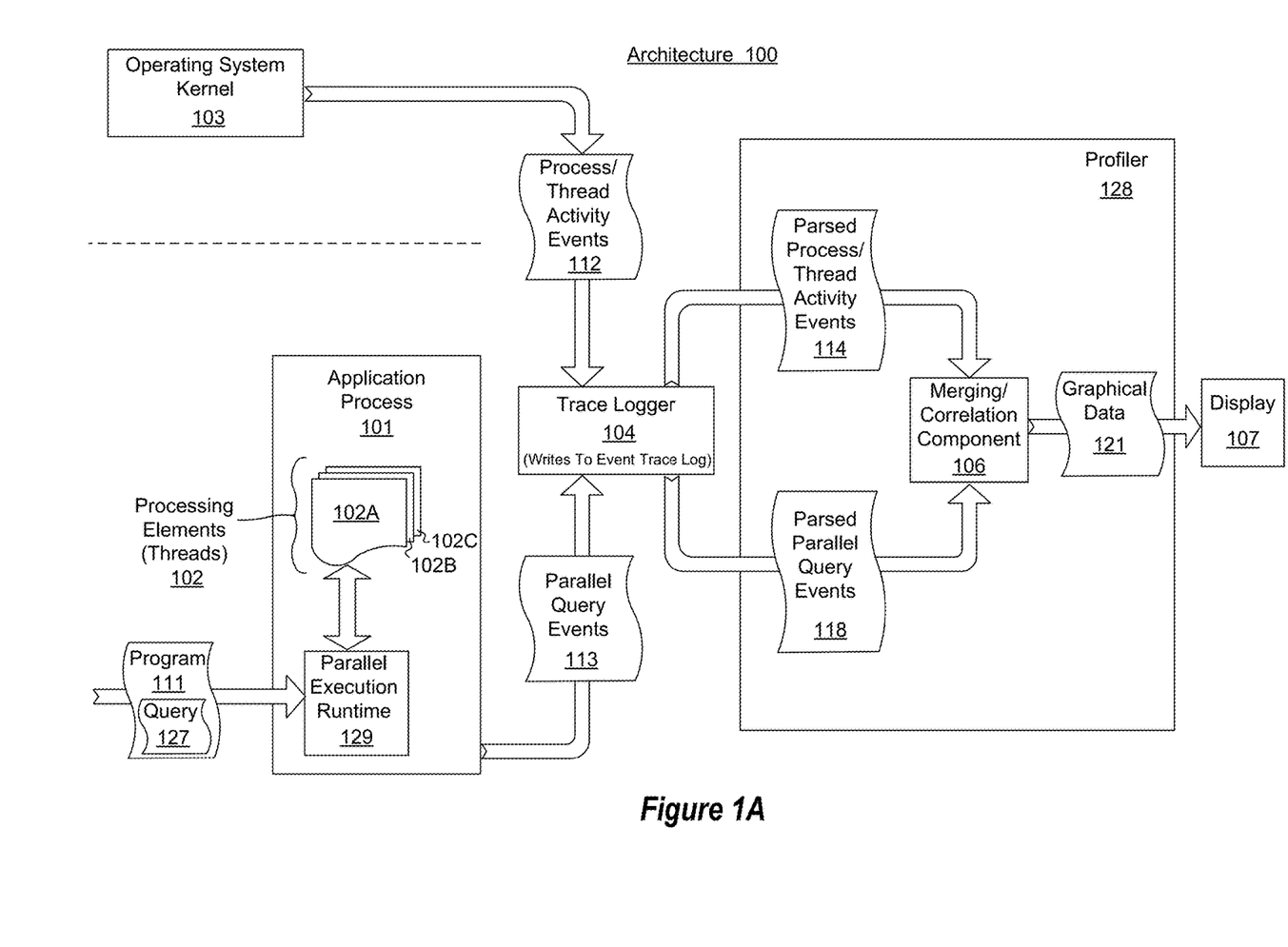
FIG. 1A illustrates an example computer architecture that facilitates presenting program execution details resulting from parallel execution of a program.

FIG. 1A illustrates an example computer architecture 100 that facilitates presenting program execution details resulting from parallel execution of a program. Referring to FIG.

1A, computer architecture 100 includes application process 101, further including processing elements 102 and parallel execution runtime 129, operating system kernel 103, trace logger 104, profiler 128, furthering including merging/correlation component 106, and display 107. Each of the components in computer architecture 100 can be connected to one another via a system bus. Accordingly, the components can communicate with one another over the system bus.

Alternately, one or more of the depicted components in computer architecture 100 can be connected to one another over (or be part of) a network, such as, for example, a Local Area Network ("LAN"), a Wide Area Network ("WAN"), and even the Internet. Accordingly, each of the one or more depicted components as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

As depicted, application process 101 includes processing elements 102 and parallel execution runtime 129. Processing elements 102 further include a plurality of processing elements, including processing elements 102A, 102B, and 102C. In some embodiments, computer architecture 100 represents a single computing device including one or more processing units, wherein each processing unit further includes one or more processing cores. In these single computing device embodiments, each processing element 102A, 102B, 102C, etc. can represent a processing unit and/or processing core within the single computer device. In other embodiments, computer architecture 100 includes a plurality of interconnected computing devices in a cluster, grid, etc. In these other multiple computing device embodiments, each processing element can represent one of the plurality of computing devices.

Accordingly, parallel execution runtime 129 and processing units 102 provide an environment for parallel execution of programs. That is, parallel execution runtime 129 can coordinate concurrent execution of different portions of a program on differing processing units 102. Application process 101 can output parallel (e.g., query related) events during parallel execution.

In some embodiments, processing units 102 in combination with other libraries and/or software provide an environment for executing programs in parallel using program extensions to manage concurrency. For example, Parallel Extensions to the .Net framework can be used to expose data parallelism through the use of queries. Parallel Extensions to the .Net framework can include instructions Parallel Language Integrated Query ("PLINQ"), Task Parallel Library ("TPL"), and a set of coordinated data structures ("CDS").

Operating system kernel 103 is configured to generate processor and thread activity and utilization during program execution when a program is executed (in parallel) on processing elements 102.

Trace logger 104 is configured to receive process/thread activity events as well as parallel query events. Trace logger 104 can aggregate process/thread activity events and parallel query events into a file or file, such as, for example, trace logs.

Merging/correlation component 106 can receive trace logs and parse differ types of events (e.g., process/thread activity events and/or parallel query events). Merging/correlation component 106 can merge different events into the same time line and convert the merged events into a graphical representation. The graphical representation can be output at display 107. Merging/correlation component 106 can also supplement graphical representations with further graphical data representing visualizations of event markers generated by executed instructions.

Figure 2:
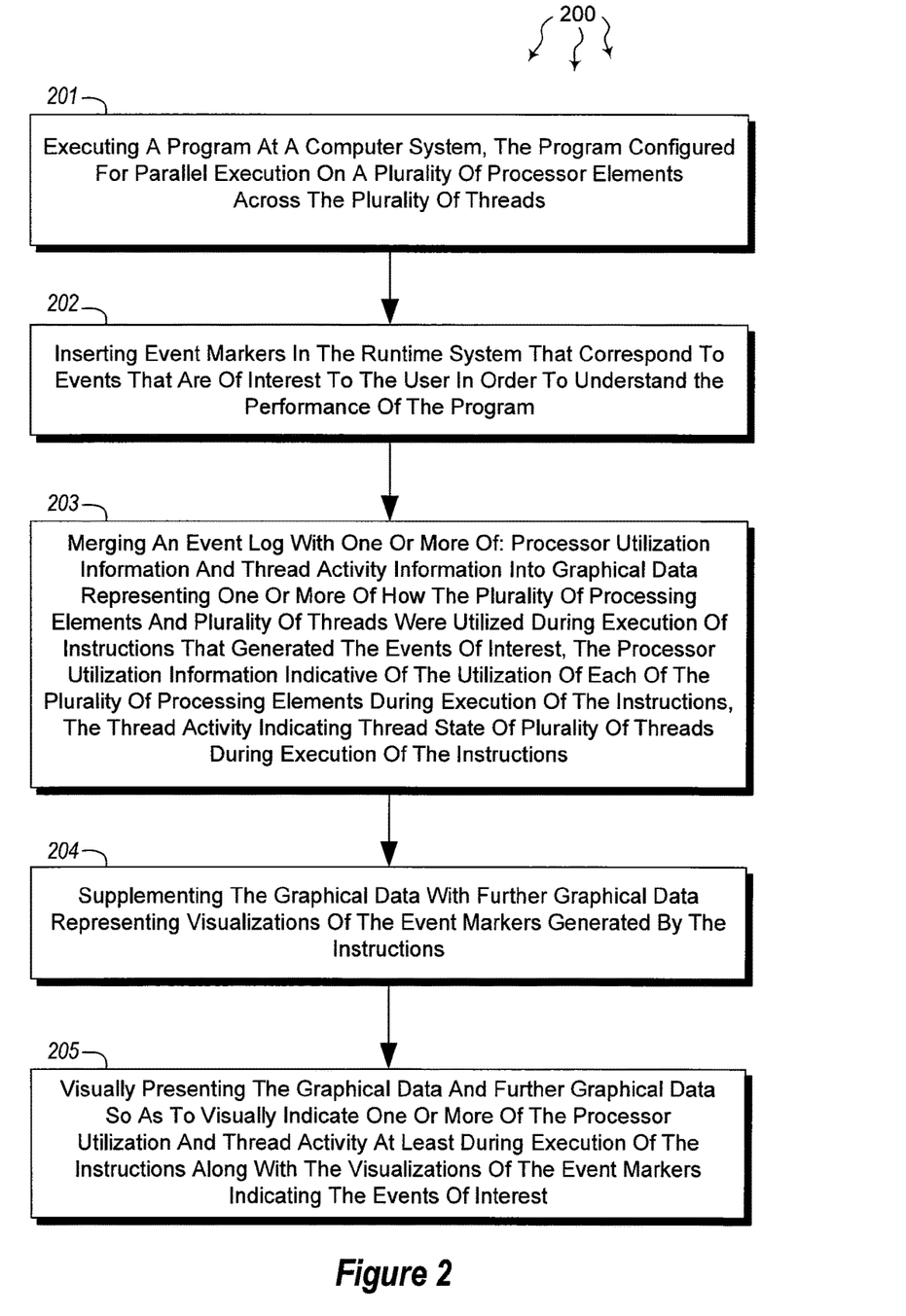
FIG. 2 illustrates a flow chart of an example method for presenting program execution details resulting from parallel execution of a program.

FIG. 2 illustrates a flow chart of an example method 200 for presenting program execution details resulting from parallel execution of a program. Method 200 will be described with respect to the components and data in computer architecture 100.

Method 200 includes an act of executing a program at the computer system, the program configured for parallel execution on the plurality of processor elements across the plurality of threads (act 201). For example, computer architecture 100 can execute program 111. Program 111 can be configured for parallel execution. As such, application process 101 can be instantiated to execute program 111 in parallel. Parallel execution runtime 129 can coordinate the parallel execution of program 111 across at least two of processing elements (threads) included in processing elements (threads) 102.

Method 200 includes an act of inserting event markers in the runtime system that correspond to events of interest to a user in order to understand performance of the program (act 202). In some embodiments, event markers for at least one parallel query event are inserted into an event log. The event markers can be inserted during execution of the program on the plurality of processor elements and can indicate the span of execution of a query. For example, during execution, application process 101 can output parallel query events 113. Trace logger 104 can receive parallel query events 113 and subsequently include the parallel query events 113 in an event log. Merging/correlation component 106 can then parse parallel query events to generate parse parallel query events 118

In some embodiments, a parsed parallel query event includes a marker pair. The marker pair can include a query begin event indicating the beginning of the query's execution and a query end event marker indicating the end of the query's execution. Each marker can also be associated with an identifier specifying the originating task that called the query. For example, turning to FIG. 1B, marker pair 119 can indicate the span of execution of query 127 during execution of program 111. More specifically, marker 119B can identify the beginning of query 127's execution and marker 119E can identify the end of query 127's execution. Markers 119B and 119E each include query identifier 128 identifying query 127 and task ID 129 identifying the task that called query 127.

During execution of program 111, operating system kernel 103 can also generate process/thread activity events 112. Process/thread activity events 112 can indicate one or more of: the utilization of each of the plurality of processing elements 102 during execution of program 111 and the thread state of a plurality of threads during execution of the program 111. Trace logger 104 can receive process/thread activity events 112 and include process/thread activity events 112 in an event log. Profiler 128 can then parse process/thread activity events 112 to generate parsed process/thread activity events 114. In some embodiments, parsed process/thread activity events include one or more of processor utilization and thread activity. For example, turning to FIG. 1B, parsed process/thread activity events 114 includes processor utilization 116 and thread activity 117. Processor utilization 116 can indicate the utilization of each of the plurality of processing elements 102 during execution of the program 111. Thread activity 117 can indicate the thread state of the plurality of threads during execution of program 111.

Method 200 includes an act of merging an event log with one or more of: processor utilization information and thread activity information into graphical data representing one or more of how the plurality of processing elements and plurality of threads were utilized during execution of instructions that generated the events of interest, the processor utilization information indicative of the utilization of each of the plurality of processing elements during execution of the instructions, the thread activity indicating thread state of the plurality of threads during execution of the instructions (act 203). For example, merging correlation/component 106 can merge parsed process/thread activity events 114 and parsed parallel query events 118 into graphical data 121. Accordingly, in some embodiments, marker events are merged with processor threads and/or processor cores information.

Figure 1B:
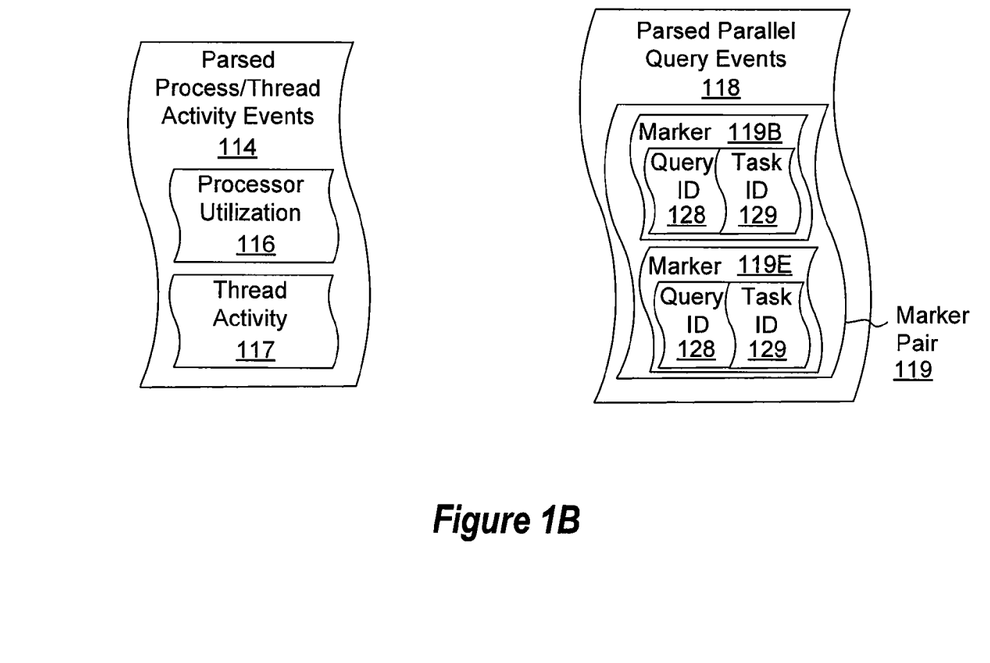
FIG. 1B depicts a more detailed view of parsed process/thread activity events and parsed parallel query events.

Depending on the contents of parsed process/thread activity events 114, graphical data 121 can indicate one or more of how the plurality of processing elements 102 and plurality of threads were utilized during execution of query 127.

Method 200 includes an act of supplementing the graphical data with further graphical data representing visualizations of the event markers generated by the instructions (act 204). For example, merging/correlation component 106 can supplement graphical data 121 with further graphical data representing visualizations of parallel query events 113. Other graphical data besides and/or in addition to graphical data depicting events can also be included in the further graphical data. For example, text and/or numbers can be included in a tooltip or some other form of representation.

Method 200 includes an act of visually presenting the graphical data and further graphical data so as to visually indicate one or more of processor utilization and thread activity at least during execution of the instructions along with the visualizations of the event markers indicating the events of interest (act 205). For example, computer architecture 100 can visually present graphical data 121 and further graphical data representing visualizations of parallel query events 113 at display 107. The presentation of graphical data 121 and further graphical data visually indicates one or more of processor utilization and thread activity at least during execution of the query 127 along with visualizations of parallel query events 113. For example, processor utilization and thread activity can be based on query ID 128 and task ID 129.

Figure 3A:
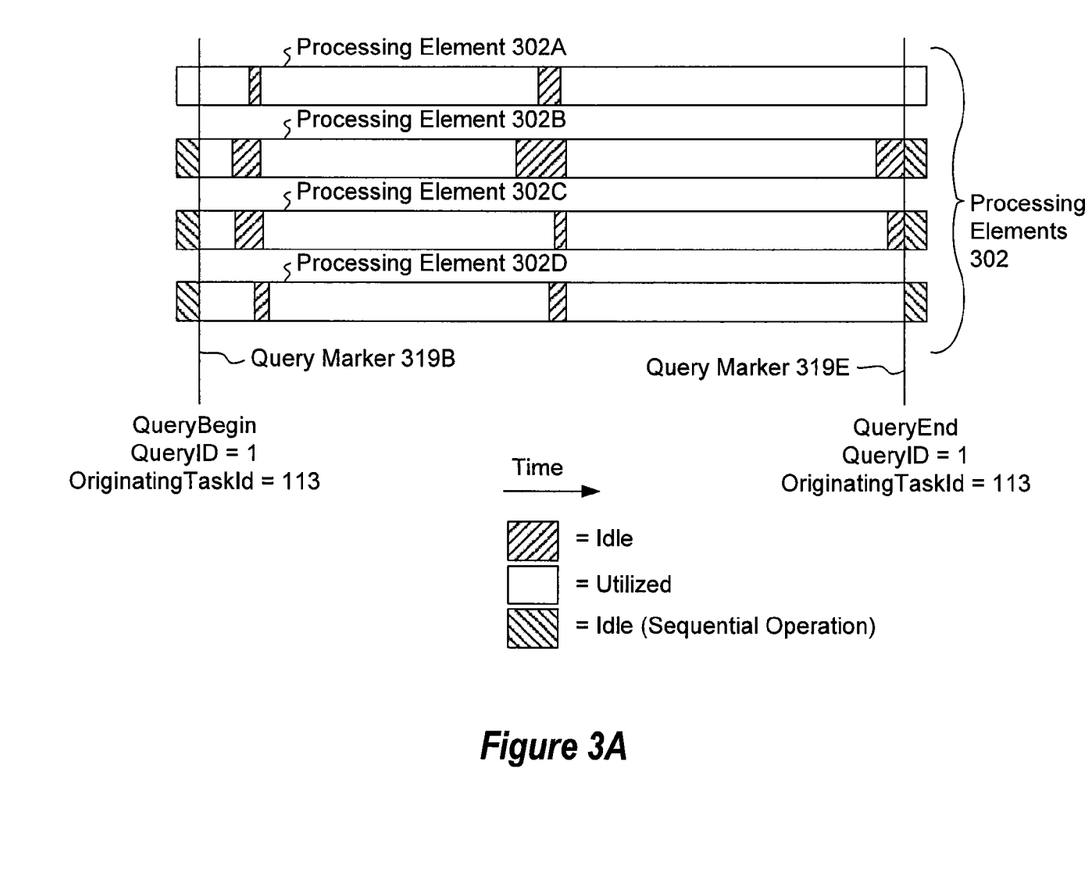
FIG. 3A illustrates an example presentation of program execution details resulting from parallel execution of a program

Turning now to FIG. 3A, FIG. 3A depicts an example of visually presented graphical data indicating processing element utilization during a query. As depicted, processing elements 302 includes processing elements 302A-302D. Query markers 319B and 319E are a marker pair representing the execution of a query. Query markers 319B and 319E correspond to a query having query ID=1 and originating task ID=113. Query marker 319B indicates the beginning of the query. Prior to query marker 319B, processing element 302A is being used for sequential execution. During sequential execution, processing elements 302B, 302C, and 302D are idle.

Subsequent to query marker 319B, various different processing elements 302A-302D are utilized concurrently (and at times simultaneously) to implement the having query ID=1. A transition to concurrent execution can result from a thread on processing element 302A forking into additional threads on processing elements 302B, 302C, and 302D. During concurrent execution, different processing elements can be utilized and/or be idle at various different times as tasks corresponding the query are executed.

Query marker 319E indicates the beginning of the query. Prior to query marker 319E various different processing elements 302A-302D are utilized concurrently (and at times simultaneously) to implement the having query ID=1. Subsequent to query marker 319E, processing element 302A is again being used for sequential execution resulting processing elements 302B, 302C, and 302D being idle. A transition to sequential execution can result from threads at processing elements 302B, 302C, and 302D joining into a thread on processing unit 302A.

Figure 3B:
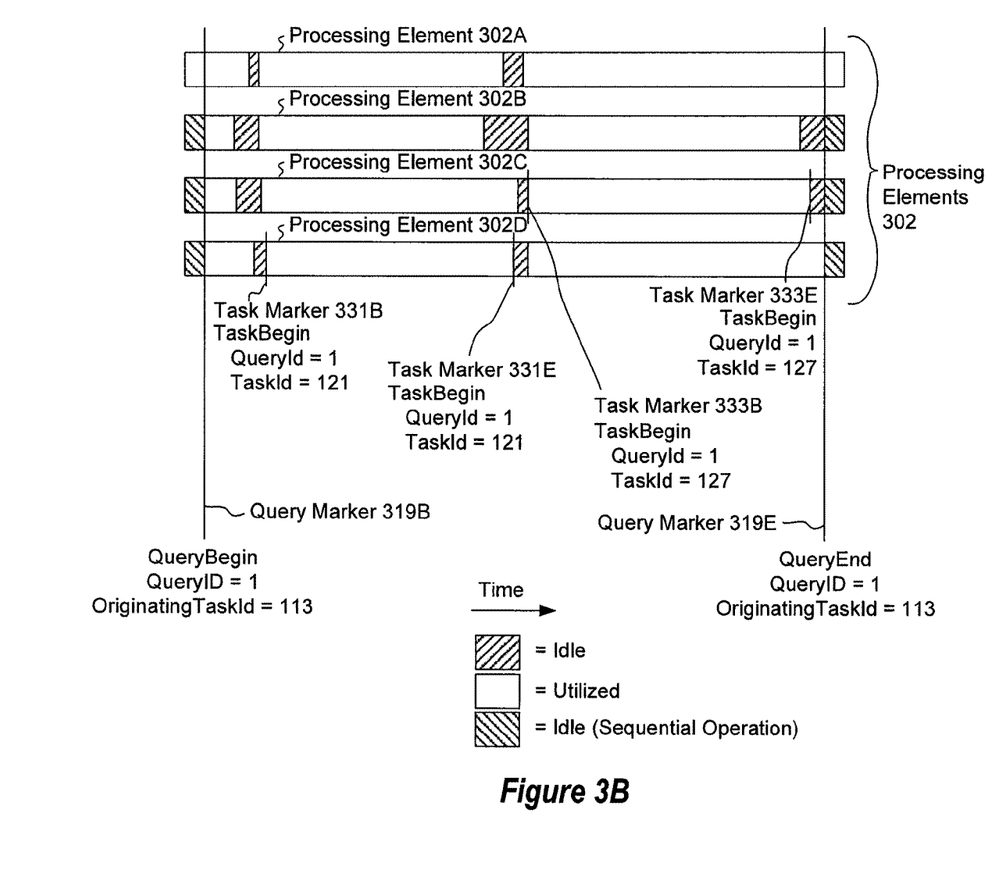
FIG. 3B illustrates another example presentation of program execution details resulting from parallel execution of a program.

Thus, within the boundaries of a query execution can be accomplished by several fork/join groupings via additional tasks. Further marker pairs can be used to indicate the start and end of a task within a query. For example, FIG. 3B depicts an example of visually presented graphical data indicating processing element utilization during a query and included tasks.

Similar to FIG. 3A, the beginning and end of the query are indicated by markers 319B and 319E. Additional markers are used to indicate the begging and end of tasks within the query. For example, task markers 331B and 331E indicate the beginning and end of a task executed on processing element 302D. Task markers 331B and 331E indicate a task corresponding to the query (i.e., having Query ID=1) respectively and having a task ID=121. Task markers 333B and 333E indicate the beginning and end of a task executed on processing element 302C. Task markers 333B and 333E indicate another task corresponding to the query (i.e., having Query ID=1) respectively and having a task ID=127.

In embodiments that more specifically use PLINQ, higher level markers can be used for QueryBegin and QueryEnd. QueryBegin identifies the beginning of a query's execution and QueryEnd identifies that the query has enumerated to completion. Event markers for QueryBegin and QueryEnd can each have identifying information such as a unique ID for the query (queryID) and an ID to specify which Task in the system called the PLINQ query to enumerate (originatingTaskId).

An originatingTaskId can be used for composability. For example, within the boundaries of QueryBegin and QueryEnd event markers, execution can be accomplished by several fork/join groupings via additional tasks. Each task has TaskBegin and TaskEnd markers to expose the inner workings of the system. TaskBegin and TaskEnd markers each have, among other properties, queryId and taskId properties to help identify which query in the system they belong to and which task in the system is performing the execution work. A queryID can be unique per RunTime and per application context (e.g., an AppDomain). This uniqueness helps distinguish the components of each query from the components in other queries when there are overlaps between multiple queries.

QueryGroupBegin and QueryGroupEnd event markers can be used to identify multiple levels of fork/joins in a pattern like: {QueryBegin {QueryGroupBegin {TaskBegin, TaskEnd}, QueryGroupEnd}, QueryEnd}.

Within a query, other events may also be of value in understanding additional state changes in the system. Accordingly, appropriate markers can be used to indicate these events. A marker for SequentialFallBack events can be used exists to alert a user when a query was not run in parallel and instead ran on a single thread or task. A marker for PartialSequentialFallBack event can be used to alert a user when a query ran partially in parallel, then fell back to sequential execution.

A marker for Cancellation events can be used to alert the user to a point where a query was explicitly cancelled in the system. A Cancellation event marker can help show latency between when a cancellation called and when tasks stopped execution and when element yielding completed.

A marker for FirstElementYielded events can alert a user to the time after the QueryBegin event and before the QueryEnd event when the first element was produced by the data parallel query system. A marker for QueryPrematureMerge events can alert a user to the time mid-query when the system deemed it necessary to force a merge mid-query in order to execute the query properly. A QueryPrematureMerge event marker may provide enough information for a user to change the query shape to increase performance.

A marker for QueryRepartioned event can alerts a user when data parallel execution may have need to partition the data source mid-query execution. Markers for other sub-events are also possible to alert a user to specific partitioning types and other intrinsics of data parallel execution engine.

In other embodiments, such as, for example, for TPL, other markers can also be used. For example, markers can be used to mark ParallelOperationBegin and ParallelOperationEnd. ParallelOperationBegin identifies the beginning of an operation's execution, and ParallelOperationEnd identifies that the operation has executed all iterations to completion.

Accordingly, event markers can be used to indicate an abstracted outer layer of execution as well as internal specifics (e.g., fork/join). Unique identifiers can be used, enabling a developer to reason about how queries compose. Using event markers the working details of parallel processing systems, including systems that provide data parallelism, can be exposed. Event markers can be used to show a variety of execution characteristics including higher-level markers to indicate the beginning and end of an execution program (e.g., a query). Inside the execution program (query) individual fork/join operations can be indicated with sub-levels of markers to expose their operations. Additional decisions made by an execution engine, such as, for example, when elements initially yield, when queries overlap or nest, when the query is cancelled, when the query bails to sequential operation, when premature merging or re-partitioning are needed can also be exposed.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including a plurality of processor elements and system memory, the computer system configured to utilize the plurality of processor elements for parallel execution of programs across a plurality of threads, a method for presenting program execution details resulting from parallel execution of a program at the computer system, the method comprising:

an act of executing a program at the computer system, the program configured for parallel execution on the plurality of processor elements across the plurality of threads and the program comprising outer layer programming abstractions which abstract, and therefore hide, from a developer of the program, internal specific implementation details of the parallel execution which correspond to the outer layer programming abstractions;

an act of inserting event markers in the runtime system that correspond to events that are of interest to a user in order to understand performance of the program, wherein the event markers comprise markers which identify the outer layer programming abstractions and markers which identify the internal specific implementation details of the parallel execution which have been abstracted from the developer, wherein inserting event markers in the runtime system comprises inserting a plurality of event markers into an event log during execution of a Parallel Language Integrated Query (PLINQ) query to provide data on how PLINQ and a Task Parallel Library (TPL) interact together;

an act of merging the event log with one or more of: processor utilization information and thread activity information into graphical data representing one or more of how the plurality of processing elements and plurality of threads were utilized during execution of instructions that generated the events of interest, the processor utilization information indicative of the utilization of each of the plurality of processing elements during execution of the instructions, the thread activity indicating thread state of the plurality of threads during execution of the instructions;

an act of supplementing the graphical data with further graphical data representing visualizations of the event markers generated by the instructions; and an act of visually presenting the graphical data and the further graphical data so as to visually indicate one or more of processor utilization and thread activity at least during execution of the instructions along with the visualizations of the event markers indicating the events of interest.

2. The method as recited in claim 1, wherein the act of inserting event markers in the runtime system comprises an act of inserting at least one pair of high level markers into the event log during execution of the program on the plurality of processor elements, the pair of high level markers indicating the span of execution of a query, the pair of high level markers including a query begin event marker identifying the beginning of the query's execution and a query end event marker identifying the end of the query's execution.

3. The method as recited in claim 2, further comprising:

an act of inserting one or more pairs of task event markers between the query begin event marker and the query end event marker in the event log, each set of task event markers indicating the span of execution of a task within the query, each pair of task markers including a task begin event marker identifying the beginning of the corresponding task's execution and a task end event marker identifying the end of the corresponding task's execution, each pair of task markers including a unique query identifier and a task identifier, the query identifier indicating that the task belongs to the query, the task identifier indicating which task in the computer system is executing.

4. The method as recited in claim 3, further comprising:

an act of inserting one or more pairs of query group event markers between the query begin event marker and the query end event marker in the event log, each set of query group event markers used to nest one of multiple levels of fork and join groupings, each pair of query group markers including a query group begin event marker identifying the beginning of a query group at one of the multiple levels of fork/joins and a query group end event marker identifying the end of the query group at one of the multiple levels of fork and join groupings.

5. The method as recited in claim 4, wherein the act of inserting one or more pairs of query group event markers between the query begin event marker and the query end event marker in the event log comprises an act of inserting a pair of query group event markers between the query begin event marker and the query end event marker in the event log; and further comprising:

an act of inserting one or more pairs of task event markers between the query group begin event marker and the query group end event marker in the event log.

6. The method as recited in claim 2, wherein the query begin event marker and the query end event marker each include a unique query identifier identifying the query for the query and a task identifier specifying the originating task that called the query.

7. The method as recited in claim 6, wherein the act of visually presenting the graphical data and the further graphical data comprises an act of visually presenting one or more of the unique query identifier and task identifier.

8. The method as recited in claim 2, further comprising an act of inserting one or more other event markers between query begin event marker and the query end event marker in the event log to indicate state changes in the computer system, the one or more other event markers for indicating state changes selected from among:

a sequential fall back event indicating when a query was not run in parallel, a partial sequential fall back event indicating when a query was ran partially in parallel and then fell back to sequential execution, a cancellation event that indicates where a query was expressly cancelled, a first element yielded event that indicates a time after the query begin event and before the query end event when the first result element was produced by parallel execution, a query premature merge event that indicates a time mid-query when the computer system deemed it necessary to force a merge, and a query repartitioned event that indicates when parallel execution may have needed to partition a data source mid-query.

9. The method as recited in claim 1, wherein the act of inserting event markers in the runtime system comprises an act of inserting a pair of high level markers into the event log during execution of the program on the plurality of processor elements, the pair of high level markers indicating the span of execution of the program, the pair of high level markers including a parallel operation begin event marker identifying the beginning of the program's execution and a parallel operation end event marker identifying that the program has executed all iterations to completion.

10. The method as recited in claim 1, wherein the act of executing a program comprises an act of execution a Parallel Language Integrated Query (PLINQ) query.

11. The method as recited in claim 1, wherein the act of visually presenting the graphical data and the further graphical data comprises an act of presenting one of text or a callstack indicating an event of interest.

12. The method as recited in claim 1, wherein the act of visually presenting the graphical data and the further graphical data comprises an act of indicating one of when an event of interest occurred and where an event of interest occurred in the source code for the program.

13. The method as recited in claim 1, wherein the act of executing the programming using parallel execution on the plurality of processing elements comprises an act of executing the programming using parallel execution on one of: a plurality of different processors and a plurality of different processing cores in the same processors.

14. A computer program product for use at a computer system including a plurality of processor elements and system memory, the computer system configured to utilize the plurality of processor elements for parallel execution of programs across a plurality of threads, the computer program product for implementing a method for presenting program execution details resulting from parallel execution of a program at the computer system, the computer program product comprising one or more computer storage hardware devices having stored thereon computer executable instructions that, when executed, cause the computer system to perform the method, including the following:

execute the program using parallel execution on the plurality of processor elements across the plurality of threads, wherein the program comprises outer layer programming abstractions which abstract, and therefore hide, from a developer of the program, internal specific implementation details of the parallel execution which correspond to the outer layer programming abstractions;

insert event markers in the runtime system that correspond to events that are of interest to a user in order to understand performance of the program, wherein the event markers identify the outer layer programming abstractions and identify the internal specific implementation details of the parallel execution which have been abstracted from the developer, wherein inserting event markers in the runtime system comprises inserting a plurality of event markers into an event log during execution of a Parallel Language Integrated Query (PLINQ) query to provide data on how PLINQ and a Task Parallel Library (TPL) interact together;

merge the event log with one or more of: processor utilization information and thread activity information into graphical data representing one or more of how the plurality of processing elements and plurality of threads were utilized during execution of instructions that generated the events of interest, the processor utilization information indicative of the utilization of each of the plurality of processing elements during execution of the instructions, the thread activity indicating thread state of the plurality of threads during execution of the instructions;

supplement the graphical data with further graphical data representing visualizations of the event markers generated by the instructions; and visually present the graphical data and further graphical data so as to visually indicate one or more of processor utilization and thread activity at least during execution of the instructions along with the visualizations of the event markers indicating the events of interest.

15. The computer program product as recited in claim 14, wherein computer executable instructions that, when executed, cause the computer system to insert event markers in the runtime system that correspond to events that are of interest to the user comprise computer executable instructions that, when executed, cause the computer system to insert at least one pair of high level markers into the event log during execution of the program on the plurality of processor elements, the pair of high level markers indicating the span of execution of a query, the pair of high level markers including a query begin event marker identifying the beginning of the query's execution and a query end event marker identifying the end of the query's execution.

16. The computer program product as recited in claim 15, further comprising computer executable instructions that, when executed, cause the computer system to insert one or more pairs of query group event markers between the query begin event marker and the query end event marker in the event log, each set of query group event markers used to nest one of multiple levels of fork and join groupings, each pair of query group markers including a query group begin event marker identifying the beginning of a query group at one of the multiple levels of fork/joins and a query group end event marker identifying the end of the query group at one of the multiple levels of fork and join groupings.

17. The computer program product as recited in claim 16, wherein computer executable instructions that, when executed, cause the computer system to insert one or more pairs of query group event markers between the query begin event marker and the query end event marker in the event log comprise computer executable instructions that, when executed, cause the computer system to insert a pair of query group event markers between the query begin event marker and the query end event marker in the event log; and further comprising computer executable instructions that, when executed, cause the computer system to:
insert one or more pairs of task event markers between the query group begin event marker and the query group end event marker in the event log.

18. The computer program product as recited in claim 14, wherein computer executable instructions that, when executed, cause the computer system to insert event markers in the runtime system that correspond to events that are of interest to the user in order to understand performance of the program comprise computer executable instructions that, when executed, cause the computer system to insert a pair of high level markers into the event log during execution of the program on the plurality of processor elements, the pair of high level markers indicating the span of execution of the program, the pair of high level markers including a parallel operation begin event marker identifying the beginning of the program's execution and a parallel operation end event marker identifying that the program has executed all iterations to completion.

19. A computer system, the computer system comprising:
a system memory;
a plurality of processing elements;
a display; and
one or more computer storage media having stored thereon computer-executable instructions representing a Parallel Language Integrated Query (PLINQ) query, an event log generator, a process monitor, and a merging component, wherein the PLINQ query is configured to:
execute on the plurality of processor elements across a plurality of threads;
insert at least one pair of high level markers into an event stream during execution on the plurality of processor elements, the pair of high level markers indicating the span of execution of the PLINQ query, the pair of high level markers including a query begin event marker identifying the beginning of the query's execution and a query end event marker identifying the end of the query's execution, the high level markers corresponding to an outer layer programming abstraction which abstracts, and therefore hides, from a developer, internal specific implementation details of parallel execution which correspond to the outer layer programming abstraction;
wherein the event log generator is configured to access the event stream and convert the event stream into an event log including the at least one pair of high level markers, corresponding to the outer layer programming abstraction, and including event markers which indicate internal specific implementation details of the parallel execution of the plurality of threads which have been abstracted, and therefore hidden, from the developer of the PLINQ query;
wherein inserting at least one pair of high level markers comprises inserting a plurality of event markers into the event log during execution of the PLINQ query to provide data on how PLINQ and a Task Parallel Library (TPL) interact together;
wherein the process monitor is configured to monitor processor utilization and thread activity during execution of the PLINQ query and converting the processor utilization and thread activity into overlay information indicative of the utilization of each of the plurality of processing elements during execution of the PLINQ query and indicative of thread state of the plurality of threads during execution of the PLINQ query;
wherein the merging component is configured to:
merge the event log with the overlay data into graphical data representing processor utilization and thread activity relative to events in the event log and send the graphical data to the display; and
supplement the graphical data with further graphical data representing visualizations of the pair of high level event markers indicating the span of execution of PLINQ query; and
wherein the display is configured to receive and display the graphical data and the further graphical data so as to visually indicate one or more of processor utilization and thread activity at least during execution of the PLINQ query along with visualizations for the pair of high level event markers indicating the span of execution of PLINQ query.

* * * * *